United States Patent [19]

Barker

[11] Patent Number: 5,348,815
[45] Date of Patent: Sep. 20, 1994

[54] PROTECTIVE BATTERY CAP

[75] Inventor: Ronald S. Barker, Brewster, N.Y.

[73] Assignee: Black & Decker Inc., Newark, Del.

[21] Appl. No.: 74,648

[22] Filed: Jun. 10, 1993

[51] Int. Cl.$^5$ .................... H01M 2/04; H01M 2/06
[52] U.S. Cl. .................... 429/65; 429/175
[58] Field of Search ............ 429/65, 96, 100, 175

[56] References Cited

U.S. PATENT DOCUMENTS

| | | |
|---|---|---|
| 1,118,121 | 11/1914 | Gillingham . |
| 1,168,078 | 1/1916 | Jefferson . |
| 1,176,468 | 3/1916 | Koretzky .................... 429/65 |
| 1,836,903 | 12/1931 | Chaney . |
| 2,070,426 | 2/1937 | Faber .................... 429/65 |
| 2,396,693 | 3/1946 | Glover .................... 136/133 |
| 2,444,616 | 7/1948 | Rock .................... 136/133 |
| 2,516,084 | 7/1950 | Wells .................... 136/162 |
| 2,729,693 | 1/1956 | Waber .................... 136/133 |
| 3,473,965 | 10/1969 | Barge .................... 136/169 |
| 3,480,481 | 11/1969 | Gauthier et al. .................... 136/111 |
| 3,655,456 | 4/1972 | Hamel .................... 429/65 |
| 4,020,245 | 4/1977 | Mabuchi et al. .................... 429/100 |
| 4,698,459 | 10/1987 | Drake .................... 174/138 F |
| 4,770,958 | 9/1988 | Newman et al. .................... 429/177 |
| 5,021,305 | 6/1991 | Turner .................... 429/65 |

FOREIGN PATENT DOCUMENTS 57-44968  3/1982  Japan .................... 429/65

*Primary Examiner*—Stephen Kalafut
*Attorney, Agent, or Firm*—Barry E. Deutsch

[57] ABSTRACT

A battery assembly is provided having a battery and a one-piece battery cap fixedly connected to an end of the battery over a positive terminal of the battery. The cap has a first section with a raised contact receiving section. The raised contact receiving section has a side aperture into an area between the positive terminal and the raised contact receiving section. The aperture is generally perpendicular to the first section. The cap has a second section that snap-lock mounts onto the first end of the battery.

20 Claims, 1 Drawing Sheet

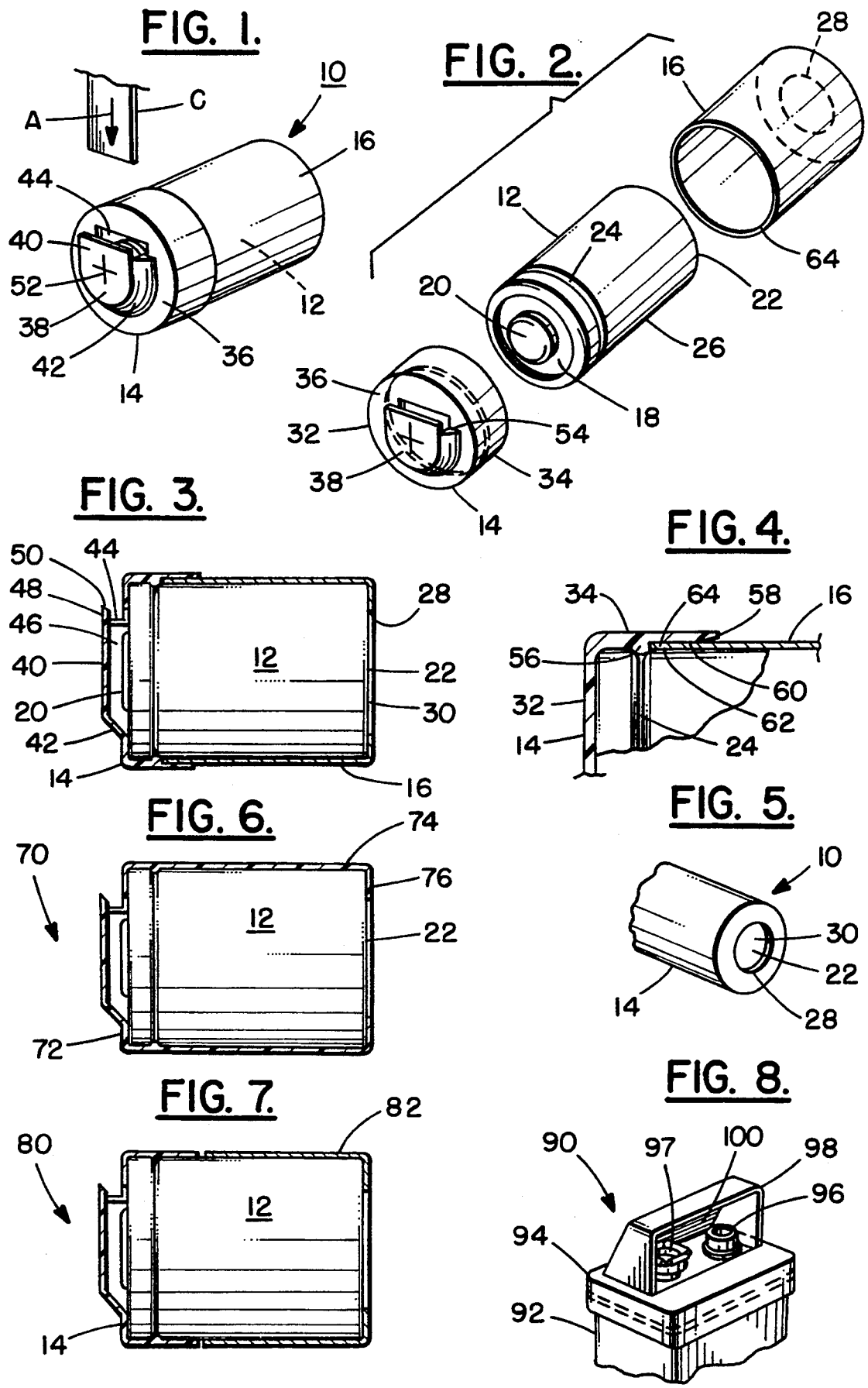

PROTECTIVE BATTERY CAP

BACKGROUND OF THE INVENTION

1. Field of the Invention

The present invention relates to batteries and, more particularly, to a protective cap for a battery.

2. Prior Art

U.S. Pat. No. 1,118,121 discloses a protective seal with a cardboard cap and a thin strip of adhesive paper that connects the cap to the battery. Corners of the cap are cut off to provide access to the terminals. U.S. Pat. No. 1,168,078 discloses a dome shaped cap for a terminal of a battery. U.S. Pat. No. 4,770,958 discloses a protective shield for a battery with a cover over the battery terminals and open sides to the terminals. U.S. Pat. No. 3,473,965 discloses a pilferproof closure for a battery that covers a terminal of the battery with a removable sector. U.S. Pat. Nos. 4,698,459 and 5,021,305 disclose a battery connection protector case. U.S. Pat. No. 3,480,481 discloses a battery with a shield that has a central opening. Other related art include U.S. Pat. Nos. 2,516,084; 2,729,693; 2,396,693; 2,444,616; and 1,836,903.

SUMMARY OF THE INVENTION

In accordance with one embodiment of the present invention a battery cap is provided comprising a first section and a second section integral with the first section. The first section has a rim for contacting a top end of a battery and a raised contact receiving section. The raised contact receiving section has a single aperture through the first section into an area beneath the raised contact receiving section. The aperture is generally perpendicular to the first section. The second section extends perpendicular to the first section for fixedly mounting the first and second sections to a battery.

In accordance with another embodiment of the present invention a battery assembly is provided comprising a battery and a one-piece battery cap. The battery has a positive terminal at a first end and a negative terminal at an opposite second end. The battery cap is fixedly connected to the first end of the battery and has a raised center section over the positive terminal forming a contact receiving area between the cap and the positive terminal. The raised center section has a single side aperture substantially perpendicular to a center axis of the battery. The cap substantially encloses the positive terminal except for the single side aperture through the raised center section.

BRIEF DESCRIPTION OF THE DRAWINGS

The foregoing aspects and other features of the invention are explained in the following description, taken in connection with the accompanying drawings wherein:

FIG. 1 is a perspective view of a battery assembly incorporating features of the present invention.

FIG. 2 is an exploded perspective view of the battery assembly shown in FIG. 1.

FIG. 3 is a schematic cross sectional view of the battery assembly shown in FIG. 1.

FIG. 4 is an enlarged view of a front section of the assembly shown in FIG. 3.

FIG. 5 is a perspective view of the rear end of the assembly shown in FIG. 1.

FIG. 6 is a schematic cross sectional view of an alternate embodiment of the present invention.

FIG. 7 is a schematic cross sectional view of an alternate embodiment of the present invention.

FIG. 8 is a partial perspective view of an alternate embodiment of the present invention.

DETAILED DESCRIPTION OF THE INVENTION

Referring to FIGS. 1–3, there is shown a battery assembly 10 incorporating features of the present invention. Although the present invention will be described with reference to the embodiments shown in the drawings, it should be understood that the present invention may be embodied in various different forms of embodiment. In addition, any suitable size, shape or type of elements or materials could be used.

The assembly 10 generally comprises a battery 12, a battery cap 14, and a protective cover 16. The battery 12, in the embodiment shown, is a rechargeable 1.2 V NiCad dry cell battery. However, the present invention could be used with any suitable type of battery including non-rechargeable and wet cell batteries. In the embodiment shown, the battery 12 has a top end 18 with a positive terminal 20, a rear end or bottom end 22 that forms a negative terminal 30, and a general column shape with a ring shaped recess 24 around its side 26 near the top end 18. The rear end 22 and side 26 are comprised of a single electrically conductive metal member that is electrically isolated from the positive terminal 20. The cover 16 is provided to substantially enclose the rear end 22 and exterior side 26 except for an open area 28 at the rear end 22. The cover 16, in the embodiment shown, is comprised of paper. However, any suitable dielectric material could be used. In an alternate embodiment, such as when a battery is used with a side that is not elctrically connected to the rear end negative terminal, the cover need not be provided. Referring also to FIG. 5, the rear end of the assembly 10 is shown. The cover 16 is suitably sized and shaped to slide over the rear end 22. The open area 28 allows access to the rear end 22 to form the negative terminal 30 for the assembly 10.

The battery cap 14, in the embodiment shown, generally comprises a one-piece molded dielectric polymer member having a top section 32 and a side section 34. The top section 32 has a substantially flat peripheral rim 36 and a center contact receiving section 38. The receiving section 38 has a top 40, sloped side walls 42, and a single side aperture 44. The rim 36 is for contacting the peripheral rim of the top 18 of the battery 12. An area or space 46 is provided between the top 40 and the positive terminal 20. The top 40 has a ledge 48 that extends out over the aperture 44 and has a tapered leading edge 50. The top 40, in the embodiment shown, also has a "+" indicia 52 molded into the cap. The side aperture 44 is generally perpendicular to the top 40 and has a general "L" shape. The side aperture 44 is defined on its sides by the rim 36 at the bottom of its "L" shape and vertical sections 54 of the side walls 42. Thus, the cap 14 forms a contact receiving area or space 46 over the positive terminal 20 with a single side aperture 44 into the area 46 such that a contact C (see FIG. 1) must be inserted, as illustrated by arrow A, perpendicular to the center longitudinal axis of the battery 12 in order to obtain contact with the positive terminal 20. The tapered leading edge 50 can assist in guiding the contact C into the area 46.

The side section 34 is suitably sized and shaped to slide over the top end 18 of the battery 12 and snap-fit connect to the battery. Referring also to FIG. 4, the side section 34 has a general ring shape and includes an inwardly projecting raised ridge 56, a tapered leading edge 58, and a recessed area 60. As shown, the recessed area 60 forms an area 62 between the battery 12 and the cap 14. This area 62 receives the front 64 of the cover 16. The side section 34 is able to press the front 64 of the cover 16 against the exterior side 26 of the battery to friction hold the cover 16 in place. Alternative or additional means to hold the cover 16 in place could also be provided. The raised ridge 56 is suitably sized and shaped to snap-fit mount into the ring shaped recess 24 of the battery 12 thereby fixedly, but removably mounting the cap 14 to the battery 12. Alternative or additional means to mount the cap to the battery could also be provided.

The present invention is generally directed to solve a potential problem that may otherwise arise in regard to repair, disposal, and recycling of batteries. Increased ecological awareness has prompted U.S. federal and state governments and foreign governments to implement, or at least propose implementing, mandatory reclamation of batteries by manufacturers for recycling or proper disposal. Inherent in reclamation or recycling programs is the batch storage and transportation of collected items. Batch storage of batteries, such as in a collecting bin, poses a risk of potential fire. On occasion, some of the batteries may become electrically connected to each other due to their commonly uncovered terminals, especially if a bin or container has several hundred or several thousand batteries. Residual energy in the batteries may cause the electrically connected batteries to heat up and potentially start a fire. The present invention is designed to prevent this type of accident and thereby allow batch reclamation of batteries. The present invention covers the positive terminal of the battery with a cap that allows a blade-like contact access to the positive terminal, but otherwise substantially encloses the positive terminal. A snap-fit connection allows the cap to be both easily installed on the battery and, easily removed from the battery for ease in recycling purposes. The present invention can be used on any type of battery including standard AAA, AA, C, and D size batteries.

Referring now to FIG. 6, there is shown a schematic sectional view of an alternate embodiment of the present invention. In the embodiment shown, the battery assembly 70 has a cap 72 that has a side section 74. The side section 74 extends along the entire length of the battery 12 and around a portion of the rear end 22. No cover, as cover 16 in FIGS. 1-5, is provided in this embodiment because the cap 72 functions as the cover. In this embodiment, the rear end 76 of the side section 74 would be bent or heat shrunk onto the end 22 after the cap 72 was snapped onto the battery 12. Alternatively, the snap-lock mounting of the cap 72 to the battery 12 need not be provided.

Referring now to FIG. 7, there is shown a schematic sectional view of another alternate embodiment. In the embodiment shown, the assembly 80 includes the battery 12, the cap 14, and a separate second end cap 82. The second end cap 82 is independently connected to the battery 12 such as by press fit mounting or heat shrinking. The second cap 82 is made of a molded polymer material and, in an alternate embodiment, may be identical to the first cap 14.

Referring to FIG. 8, there is shown a partial view of an alternate embodiment of the present invention. The assembly 90 includes a battery 92 and a cap 94. The battery 92 is a 9 volt battery with both terminals 96, 97 on its top end. The cap 94 is snap-locked onto the top of the battery 92 and includes a center raised contact receiving section 98 with a single side aperture 100 into an area of the terminals. The receiving section 98 is suitably sized to receive a standard two-contact 9 volt battery connector (not shown) through the aperture 100 and over the terminals 96, 97. The receiving section 98 is resiliently deformable such that a user can press down on the top of the receiving section 98 to snap the connector (not shown) onto the terminals 96, 97.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall upon the scope of the appended claims.

What is claimed is:

1. A battery cap comprising:
   a first section having a top surface disposed generally parallel to a top end of a battery and having a rim for contacting the top end of the battery and a raised contact receiving section with a single aperture through the first section into an area beneath the raised contact receiving section, the aperture being generally perpendicular to the top surface of the first section; and
   a second section integral with the first section, the second section extending generally perpendicular to the top surface of the first section for fixedly mounting the first and second sections to a battery.

2. A battery cap as in claim 1 wherein the cap is comprised of a molded dielectric polymer material.

3. A battery cap as in claim 1 wherein a section of the aperture has a general rectangular shape.

4. A battery cap as in claim 1 wherein the raised contact receiving section has a top with a ledge extending in front of the aperture.

5. A battery cap as in claim 4 wherein the raised contact receiving section has sloped side walls extending down from the top towards the rim.

6. A battery cap as in claim 4 wherein the ledge has a tapered leading edge for guiding a contact into the area beneath the raised contact receiving section.

7. A battery cap as in claim 1 wherein the aperture has a general "L" shape.

8. A battery cap as in claim 1 wherein the second section has a general ring shape.

9. A battery cap as in claim 1 wherein the second section has an inwardly raised ridge for snap-lock mounting in a recess along a side of the battery.

10. A battery cap as in claim 1 wherein the second section has a tapered leading edge and an interior raised area behind the leading edge for receiving a protective cover surrounding a majority of the battery.

11. A battery assembly comprising:
   a battery having a positive terminal at a first end and a negative terminal at an opposite second end;
   a one-piece battery cap fixedly connected to the first end of the battery, the cap having a rim section over a rim portion of the first end of the battery and a raised center section over the positive terminal forming a contact receiving area between the cap and the positive terminal, the raised center section having a single side aperture substantially perpendicular to a center axis of the battery, the cap substantially enclosing the positive terminal except for the single side aperture through the raised center section.

12. An assembly as in claim 11 wherein the aperture has a general "L" shape.

13. An assembly as in claim 11 wherein the cap extends along the entire length of the battery.

14. An assembly as in claim 11 further comprising a protective cover attached to the battery that covers portions of the second end and a side of the battery.

15. An assembly as in claim 14 wherein the cap has a ring shaped section that is connected to the side of the battery.

16. An assembly as in claim 15 wherein the ring shaped section covers a portion of the protective cover.

17. An assembly as in claim 11 wherein the battery has a ring shaped recess on a side of the first end and the cap has a ring shaped protrusion that is located in the recess to fixedly mount the cap to the battery.

18. An assembly as in claim 11 wherein the raised center section has a top with a ledge that extends out over the side aperture.

19. An assembly as in claim 18 wherein a leading edge of the ledge is tapered.

20. An assembly as in claim 18 wherein the raised center section has side walls that taper out and away from the top.

* * * * *